Patented Mar. 24, 1936

2,035,383

UNITED STATES PATENT OFFICE 2,035,383

PRESERVATION OF ORGANIC SOLVENTS

Henry L. Cox, South Charleston, W. Va., assignor to Carbide and Carbon Chemicals Corporation, a corporation of New York No Drawing. Application March 18, 1933, Serial No. 661,573

16 Claims. (Cl. 23—250)

This invention relates to an improvement in the preservation of certain organic substances.

The group of chemicals to which the invention is particularly applicable are the alkyl ethers of alkylene or polyalkylene glycols of the 1,2 type. Included among these are the dialkyl ethers, such as ethylene glycol diethyl ether and ethylene glycol dimethyl ether; the monoalkyl ethers, such as ethylene glycol monoethyl ether, ethylene glycol monomethyl ether, ethylene glycol monobutyl ether, and propylene glycol monoethyl ether; and the alkyl ethers of polyalkylene glycols, represented by diethylene glycol monoethyl ether, diethylene glycol monobutyl ether, dipropylene glycol monoethyl ether, and triethylene glycol monoethyl ether.

The above-noted ethers, all of which are comparatively new industrially, are becoming increasingly popular as solvents for various uses in the chemical industry. In most of these applications of the ethers extreme purity of the material is desirable. While the original state of purity of the compounds can be adequately controlled by the process in which they are made, it is quite often exceedingly difficult to maintain this purity during shipping and storage. By nature these ethers have a tendency to spontaneously deteriorate on standing, with the formation of impurities which may be removed only with considerable difficulty.

This deterioration may be controlled to a certain extent by proper selection of the container material. Glass of course is used quite universally where extreme purity of a liquid must be preserved. Where, however, large volumes of the material are handled, containers of iron or iron alloys are much more appropriate, and are commonly used. In the presence of iron the ethers of this invention are susceptible to an impurity formation, which is noticeable by the development of a yellow-to-brown color.

It is an object of this invention to provide an improvement in the preservation of the group of ethers mentioned, and further to provide means for preventing color formation in these ethers when stored in containers of iron or other material.

I have found that the addition to the ether of a small quantity of a hydroxyalkylamine, such as an ethanolamine or isopropanolamine, acts as an effective preserving agent. Triethanolamine is especially suitable for this purpose, and in quantities of 0.1% by volume will prevent color formation in the liquid when stored in contact with iron. Commercial triethanolamine is here referred to which usually contains up to 5% of monoethanolamine, about 15% to 20% diethanolamine, and the balance triethanolamine. This addition agent in the amount specified is in no way detrimental to the adaptability of the ether for its various chemical uses, but still is sufficient to prevent the formation of deleterious impurities on storage.

The tendency for the ethers here mentioned to color appears to be aggravated when small amounts of aldehydes are present, and they are often present in the commercial products. With aldehydes present the ether on standing becomes browner in color than without them. The hydroxyalkylamine counteracts the effect of the aldehydes and prevents a brown coloration, but it will not entirely eliminate the yellow shade. I, therefore, propose when aldehydes are present to subject the ether to a preliminary purifying step before adding the preserving agent. Satisfactory purification may be effected by refluxing the ether with acid, neutralizing with alkali, and distilling under reduced pressure. When so purified, the resulting product can be stored for many months in the presence of small quantities of a hydroxyalkylamine without deteriorating. It can also be shipped and stored in iron under these conditions without developing color.

The following examples will serve to show the application of my invention in preserving the monoethyl ether of ethylene glycol.

About 3.8 liters of monoethyl ether of ethylene glycol were refluxed for five hours in the presence of 5 cc. of concentrated sulfuric acid. A slight excess of alkali was then added and the liquid fractionated. Three liters of material were obtained which was of high purity. To one liter of the purified ether was added 0.1% by volume of commercial triethanolamine. After storage for eight months, the material was still clear and colorless even in the presence of iron. In another test in which no triethanolamine was added to the commercial product, the ether became decidedly acid and assumed a dark brown color within six months.

From the foregoing tests the advantages of my invention will be quite evident. The triethanolamine has a preserving effect even though the ether is not previously purified, but the preliminary treatment is desirable to entirely prevent a color formation, when aldehydes are present in the product as made. Modifications in the purifying step as here indicated will be apparent to those skilled in the art, and the invention is not limited in this respect.

claim:—

1. The improvement in the preservation of monoalkyl and dialkyl ethers of the alkylene glycols of the 1,2 type, which ethers tend to deteriorate under ordinary storage conditions, which consists in adding to the pure form of the ether a hydroxyalkylamine in an amount sufficient to preserve the same.

2. The improvement in the preservation of monoethyl ether of ethylene glycol, which ether tends to deteriorate under ordinary storage conditions, which consists in adding to the ether a hydroxyalkylamine in an amount sufficient to preserve the same.

3. The improvement in the preservation of monoethyl ether of ethylene glycol, which ether tends to deteriorate under ordinary storage conditions, which consists in adding to the ether triethanolamine in an amount sufficient to serve as a preserving agent.

4. The improvement in the preservation of monoethyl ether of ethylene glycol, which ether tends to deteriorate under ordinary storage conditions, which consists in adding to the ether triethanolamine in an amount about 0.1% by volume.

5. The improvement in the preservation of monoethyl ether of ethylene glycol, which ether tends to deteriorate under ordinary storage conditions, which consists in subjecting the ether to a purifying treatment and adding to the resulting product triethanolamine in an amount sufficient to serve as a preserving agent.

6. The improvement in the preservation of monoethyl ether of ethylene glycol, which ether tends to deteriorate under ordinary storage conditions, which consists in subjecting the ether to a purifying treatment and adding to the resulting product triethanolamine in an amount about 0.1% by volume.

7. The improvement in the preservation of monoethyl ether of diethylene glycol, which ether tends to deteriorate under ordinary storage conditions, which consists in adding to the ether a hydroxyalkylamine in an amount sufficient to preserve the same.

8. The improvement in the preservation of monoethyl ether of diethylene glycol, which ether tends to deteriorate under ordinary storage conditions, which consists in adding to the ether triethanolamine in an amount sufficient to serve as a preserving agent.

9. The improvement in the preservation of monoethyl ether of diethylene glycol, which ether tends to deteriorate under ordinary storage conditions, which consists in adding to the ether triethanolamine in an amount about 0.1% by volume.

10. The improvement in the preservation of monoethyl ether of diethylene glycol, which ether tends to deteriorate under ordinary storage conditions, which consists in subjecting the ether to a purifying treatment and adding to the resulting product triethanolamine in an amount sufficient to serve as a preserving agent.

11. The improvement in the preservation of monoethyl ether of diethylene glycol, which ether tends to deteriorate under ordinary storage conditions, which consists in subjecting the ether to a purifying treatment and adding to the resulting product triethanolamine in an amount about 0.1% by volume.

12. The improvement in the preservation of monobutyl ether of ethylene glycol, which ether tends to deteriorate under ordinary storage conditions, which consists in adding to the ether a hydroxyalkylamine in an amount sufficient to preserve the same.

13. The improvement in the preservation of monobutyl ether of ethylene glycol, which ether tends to deteriorate under ordinary storage conditions, which consists in adding to the ether triethanolamine in an amount sufficient to serve as a preserving agent.

14. The improvement in the preservation of monobutyl ether of ethylene glycol, which ether tends to deteriorate under ordinary storage conditions, which consists in adding to the ether triethanolamine in an amount about 0.1% by volume.

15. The improvement in the preservation of monobutyl ether of ethylene glycol, which ether tends to deteriorate under ordinary storage conditions, which consists in subjecting the ether to a purifying treatment and adding to the resulting product triethanolamine in an amount sufficient to serve as a preserving agent.

16. The improvement in the preservation of monobutyl ether of ethylene glycol, which ether tends to deteriorate under ordinary storage conditions, which consists in subjecting the ether to a purifying treatment and adding to the resulting product triethanolamine in an amount about 0.1% by volume.

HENRY L. COX.

CERTIFICATE OF CORRECTION.

Patent No. 2,035,383.  March 24, 1936.

HENRY L. COX.

It is hereby certified that the above numbered patent was erroneously issued to "Carbide and Carbon Chemicals Corporation" as assignee, whereas said patent should have been issued to Union Carbide and Carbon Corporation, a corporation of New York, as assignee by mesne assignments, as shown by the records of assignments of this office; and that the said Letters Patent should be read with this correction therein that the same may conform to the record of the case in the Patent Office.

Signed and sealed this 20th day of April, A. D. 1937.

(Seal)

Henry Van Arsdale
Acting Commissioner of Patents.